US012761677B2

(12) United States Patent
Fuentes et al.

(10) Patent No.: US 12,761,677 B2
(45) Date of Patent: Oct. 13, 2026

(54) IC REGULATOR WITH CONSTANT CURRENT CONSUMPTION

(71) Applicant: Allegro MicroSystems, LLC, Manchester, NH (US)

(72) Inventors: Leandro Fuentes, Caba (AR); Ezequiel Rubinsztain, Buenos Aires (AR); Javier Cuneo, Buenos Aires (AR); Bruno Luis Uberti, Ciudad Autonoma de Buenos Aires (AR); Manuel Rivas, Ciudad de Buenos Aires (AR)

(73) Assignee: Allegro MicroSystems, LLC, Manchester, NH (US)

( * ) Notice: Subject to any disclaimer, the term of this patent is extended or adjusted under 35 U.S.C. 154(b) by 206 days.

(21) Appl. No.: 18/426,416

(22) Filed: Jan. 30, 2024

(65) Prior Publication Data

US 2025/0244781 A1 Jul. 31, 2025

(51) Int. Cl.

*G05F 1/56* (2006.01)
*G05F 1/565* (2006.01)
*G05F 1/575* (2006.01)

(52) U.S. Cl.

CPC .............. *G05F 1/562* (2013.01); *G05F 1/565* (2013.01); *G05F 1/575* (2013.01)

(58) Field of Classification Search

CPC ........... G05F 1/562; G05F 1/565; G05F 1/575
See application file for complete search history.

(56) References Cited

U.S. PATENT DOCUMENTS

| | | | |
|---|---|---|---|
| 3,577,176 | A | 5/1971 | Kreithen et al. |
| 4,218,647 | A | 8/1980 | Haas |
| 4,380,088 | A | 4/1983 | Lipcon |
| 4,384,363 | A | 5/1983 | Lipcon |
| 4,450,571 | A | 5/1984 | Hirayama et al. |
| 5,153,466 | A | 10/1992 | Stein et al. |
| 5,220,207 | A | 6/1993 | Kovalcik et al. |
| 5,489,846 | A | 2/1996 | Li et al. |
| 5,502,445 | A | 3/1996 | Dingwell et al. |
| 5,686,894 | A | 11/1997 | Vig et al. |
| 6,516,024 | B1 | 2/2003 | Dupuis et al. |
| 6,529,421 | B1 | 3/2003 | Marr et al. |
| 6,704,050 | B1 | 3/2004 | Washkurak |
| 6,922,134 | B1 | 7/2005 | Yones |
| 6,980,084 | B1 | 12/2005 | Yones |
| 6,995,606 | B2 | 2/2006 | Bilotti et al. |

(Continued)

OTHER PUBLICATIONS

Allegro MicroSystems Datasheet "A19200 ASIL-Compliant Wheel Speed Sensor IC", Mar. 25, 2021, 12 pages.

(Continued)

*Primary Examiner* — Lakaisha Jackson
(74) *Attorney, Agent, or Firm* — DALY, CROWLEY, MOFFORD & DURKEE, LLP

(57) ABSTRACT

An integrated circuit (IC) regulator includes a pass element and a buffer. The pass element has an input terminal coupled to the regulator input, an output terminal coupled to the regulator output, and a control terminal and the buffer has an output coupled to the regulator output. A pass element current between the input terminal and output terminal is independent of the load current associated with a functional circuit of the IC and the buffer is configured to shunt any portion of the pass element current that is greater than the load current.

14 Claims, 8 Drawing Sheets

(56) References Cited

U.S. PATENT DOCUMENTS

| | | | |
|---|---|---|---|
| 7,075,287 | B1 | 7/2006 | Mangtani et al. |
| 7,260,371 | B1 | 8/2007 | Yones |
| 7,683,592 | B2 * | 3/2010 | Soude .................... G05F 1/575 323/275 |
| 8,022,775 | B2 | 9/2011 | Julstrom et al. |
| 8,054,071 | B2 | 11/2011 | Doogue et al. |
| 8,093,670 | B2 | 1/2012 | Taylor |
| 8,122,159 | B2 | 2/2012 | Monreal |
| 8,583,111 | B2 | 11/2013 | Burgener et al. |
| 8,773,123 | B2 | 7/2014 | Doogue et al. |
| 9,621,140 | B1 | 4/2017 | Fernandez et al. |
| 9,753,476 | B1 * | 9/2017 | Shukla .................... G05F 1/562 |
| 9,762,139 | B2 | 9/2017 | Zhang |
| 9,928,194 | B2 | 3/2018 | Ross et al. |
| 10,355,876 | B2 | 7/2019 | Kishigami et al. |
| 10,411,498 | B2 | 9/2019 | Shoemaker et al. |
| 10,725,122 | B2 | 7/2020 | Rubinsztain et al. |
| 10,908,230 | B2 | 2/2021 | Rubinsztain et al. |
| 10,948,537 | B2 | 3/2021 | Forrest et al. |
| 11,711,012 | B2 | 7/2023 | Ghorband et al. |
| 11,770,322 | B1 | 9/2023 | Fuentes et al. |
| 11,885,645 | B2 | 1/2024 | Latham et al. |
| 2001/0004236 | A1 | 6/2001 | Letkomiller et al. |
| 2002/0122438 | A1 | 9/2002 | Enam et al. |
| 2002/0149036 | A1 * | 10/2002 | Yabe .................... H03F 1/305 257/207 |
| 2004/0184517 | A1 | 9/2004 | Westfield et al. |
| 2004/0189221 | A1 | 9/2004 | Kurosawa et al. |
| 2006/0113972 | A1 | 6/2006 | Mihara |
| 2007/0057660 | A1 * | 3/2007 | Lin .................... G05F 1/575 323/316 |
| 2007/0120544 | A1 * | 5/2007 | Ritter .................... G05F 1/575 323/281 |
| 2007/0200590 | A1 | 8/2007 | Lalithambika et al. |
| 2008/0096490 | A1 | 4/2008 | Okazaki et al. |
| 2012/0106219 | A1 | 5/2012 | Okuda |
| 2013/0181723 | A1 | 7/2013 | Mauder et al. |
| 2014/0159683 | A1 * | 6/2014 | Pan .................... G05F 1/575 323/280 |
| 2016/0049857 | A1 | 2/2016 | Zhang |
| 2017/0153996 | A1 | 6/2017 | Ross et al. |
| 2018/0041358 | A1 | 2/2018 | Kishigami et al. |
| 2018/0135408 | A1 | 5/2018 | Cooley et al. |
| 2018/0224873 | A1 | 8/2018 | Motz et al. |
| 2019/0204889 | A1 | 7/2019 | Kaeriyama et al. |
| 2020/0007088 | A1 | 1/2020 | Ranta et al. |
| 2020/0025837 | A1 | 1/2020 | Rubinsztain et al. |
| 2020/0028345 | A1 | 1/2020 | Roy et al. |
| 2021/0165038 | A1 | 6/2021 | Forrest et al. |
| 2022/0321809 | A1 | 10/2022 | Myers et al. |
| 2022/0321810 | A1 | 10/2022 | Myers et al. |
| 2022/0321811 | A1 | 10/2022 | Myers et al. |
| 2023/0187922 | A1 | 6/2023 | Randazzo et al. |
| 2023/0255016 | A1 | 8/2023 | Vimercati |
| 2023/0400477 | A1 | 12/2023 | Friedrich et al. |
| 2023/0409065 | A1 * | 12/2023 | Feng .................... G05F 1/59 |
| 2024/0036595 | A1 * | 2/2024 | Ferlito .................... G05F 1/565 |

OTHER PUBLICATIONS

Allegro MicroSystems Application Note "AN296233 Two-Wire and Three-Wire Sensor Interfaces", Jun. 8, 2021, 4 pages.
Allegro MicroSystems Datasheet "ATS19480 Large Air Gap, GMR Transmission Speed Sensor IC for Gear Tooth Sensing", Jul. 7, 2021, 14 pages.
Notice of Allowance dated Aug. 16, 2023 for U.S. Appl. No. 17/661,311, 16 pages.

* cited by examiner

IC REGULATOR WITH CONSTANT CURRENT CONSUMPTION

BACKGROUND

Integrated circuits (ICs) are used in a variety of electronic applications and generally include a package containing one or more semiconductor die supporting electronic circuitry (referred to herein as functional circuitry or circuits). Power is supplied to the IC through one or more pins or leads from an external supply or source, such as from a car battery. Current consumed by the IC is sometimes referred to as "$I_{CC}$" current.

ICs generally include a voltage regulator to generate a regulated voltage to power the functional circuitry. Such "on-chip" regulators can have various topologies, such as a "shunt regulator" in which a variable resistance is used to generate a regulated voltage by diverting current to ground and thus, by adjusting the input current to the regulator. In such shunt regulators, the $I_{CC}$ current is affected by the load current drawn by the functional circuitry.

Many types of sensors to measure and monitor properties of components and systems are provided in the form of an IC. Some sensor ICs include one or more magnetic field sensing elements, such as a Hall effect element or a magnetoresistance element. Example magnetic field sensor ICs include proximity detectors (sometimes referred to as magnetic switches) that sense the proximity of a ferromagnetic or magnetic object, rotation detectors that sense passing ferromagnetic or magnetic objects such as gear teeth or a ring magnet, current sensors that sense a magnetic field generated by a current flow through a conductor, and linear sensors that sense a density of a magnetic field.

Some sensor ICs communicate output data or signals through one or more dedicated output pins. Such sensor ICs are sometimes referred to as "three-wire" devices. Alternatively, some sensor ICs encode output signals in the form of two or more electrical current states, or current values transmitted on the power supply and ground connections. Such sensor ICs are sometimes referred to as "two-wire" devices and advantageously require fewer pins.

Sensor ICs are widely used in automotive control systems and other safety critical applications in which it is particularly important for sensor to function properly, even in the presence of noise. In some systems, the IC is located at a significant distance from the power supply and requires long electrical interconnections that can pick up and emit noise, thereby potentially adversely affecting sensor operation and operation of other components within the system.

Noise emissions can be attributable to the effects of load current variations within a two-wire sensor IC. Such load current noise is sometimes referred to as $I_{CC}$ emissions and emissions requirements can be stringent, particularly in safety critical applications. For example, in a shunt regulator in which variations in load current can affect the $I_{CC}$ current, emission requirements can be challenging to meet.

Bypass capacitors are often coupled across the power supply and ground connections of a sensor IC in order to filter high frequency noise. However, bypass capacitors add cost and increase circuit area requirements.

SUMMARY

The present disclosure is directed to circuits and methods for providing an IC regulator that consumes a constant current regardless of variations in power supply or load conditions. Described methodologies shunt excess supply current that is not consumed by the IC in order to thereby compensate for load current variations that would otherwise adversely affect emissions. In this way, the described regulator reduces or eliminates the need for a bypass capacitor and reduces undesirable emissions. Described arrangements can be particularly advantageous in two-wire devices in which emissions can be aggravated as compared to three-wire devices and can eliminate the need for an $I_{CC}$ controller that is often used in two-wire devices; however, the described arrangements can also be advantageous for use with other output interface configurations, such as three-wire devices and devices with more than three pins, in order to draw a clean supply current and reduce emissions attributable to load current variations. Significant noise reduction, such as on the order of greater than 40 dB, can be achieved with described arrangements.

According to the disclosure, an integrated circuit (IC) regulator includes a pass element and a buffer. The pass element has an input terminal coupled to the regulator input, an output terminal coupled to the regulator output, and a control terminal and the buffer has an output coupled to the regulator output. A pass element current between the input terminal and output terminal is independent of the load current associated with a functional circuit of the IC and the buffer is configured to shunt any portion of the pass element current that is greater than the load current.

Features may include one or more of the following individually or in combination with other features. The pass element can be a MOSFET device biased with a constant gate to source voltage. The buffer can have a first input coupled to receive a reference voltage and a second input coupled to receive a feedback voltage that is based on the regulated voltage. The buffer can include a source follower or an operational transconductance amplifier. The IC regulator can further include a transistor coupled to the pass element in a current mirror configuration and a biasing circuit coupled to the transistor and configured to establish the pass element current. The biasing circuit can include a current DAC. The biasing circuit can further include a startup circuit configured to force a current through the current mirror.

According to a further aspect of the disclosure, an integrated circuit (IC) includes a regulator having an input coupled to a supply voltage and an output at which a load current and a regulated voltage are provided and a functional circuit coupled to the output of the regulator and configured to draw the load current. The regulator includes a pass element and a buffer. The pass element has an input terminal coupled to the regulator input, an output terminal coupled to the regulator output, and a control terminal and the buffer has an output coupled to the regulator output. A pass element current between the input terminal and the output terminal is independent of the load current and the buffer is configured to shunt any portion of the pass element current that is greater than the load current.

Features may include one or more of the following individually or in combination with other features. The pass element is a MOSFET device biased with a constant gate to source voltage. In embodiments, the IC can be provided in a two-wire package having a first pin coupled to a positive connection of the supply voltage and a second pin coupled to a negative connection of the supply voltage, and an output signal of the functional circuit can be provided on the positive and negative supply voltage connections. In other embodiments, the IC can be provided in a three-wire package having a first pin coupled to a positive connection of the supply voltage, a second pin coupled to a negative connection of the supply voltage, and a third pin at which an output signal of the functional circuit is provided. The buffer can have a first input coupled to receive a reference voltage and a second input coupled to receive a feedback voltage that is based on the regulated voltage. The buffer can include a source follower or an operational transconductance amplifier. The IC can further include a transistor coupled to the pass element in a current mirror configuration and a biasing circuit coupled to the transistor and configured to establish the pass element current. The biasing circuit can include a current DAC. The biasing circuit can further include a startup circuit configured to force a current through the current mirror.

Also described is a method of providing an integrated circuit regulator including coupling a pass element between an input of the regulator to which a supply voltage is coupled and an output of the regulator to which a functional circuit is coupled and controlling the pass element to provide a pass element current through the pass element that is independent of a load current drawn by the functional circuit.

Features may include one or more of the following individually or in combination with other features. The method can further include biasing the pass element with a constant gate to source voltage. The method can further include shunting any portion of the pass element current that is greater than the load current through a buffer coupled to the regulator output.

BRIEF DESCRIPTION OF DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Figure 1:
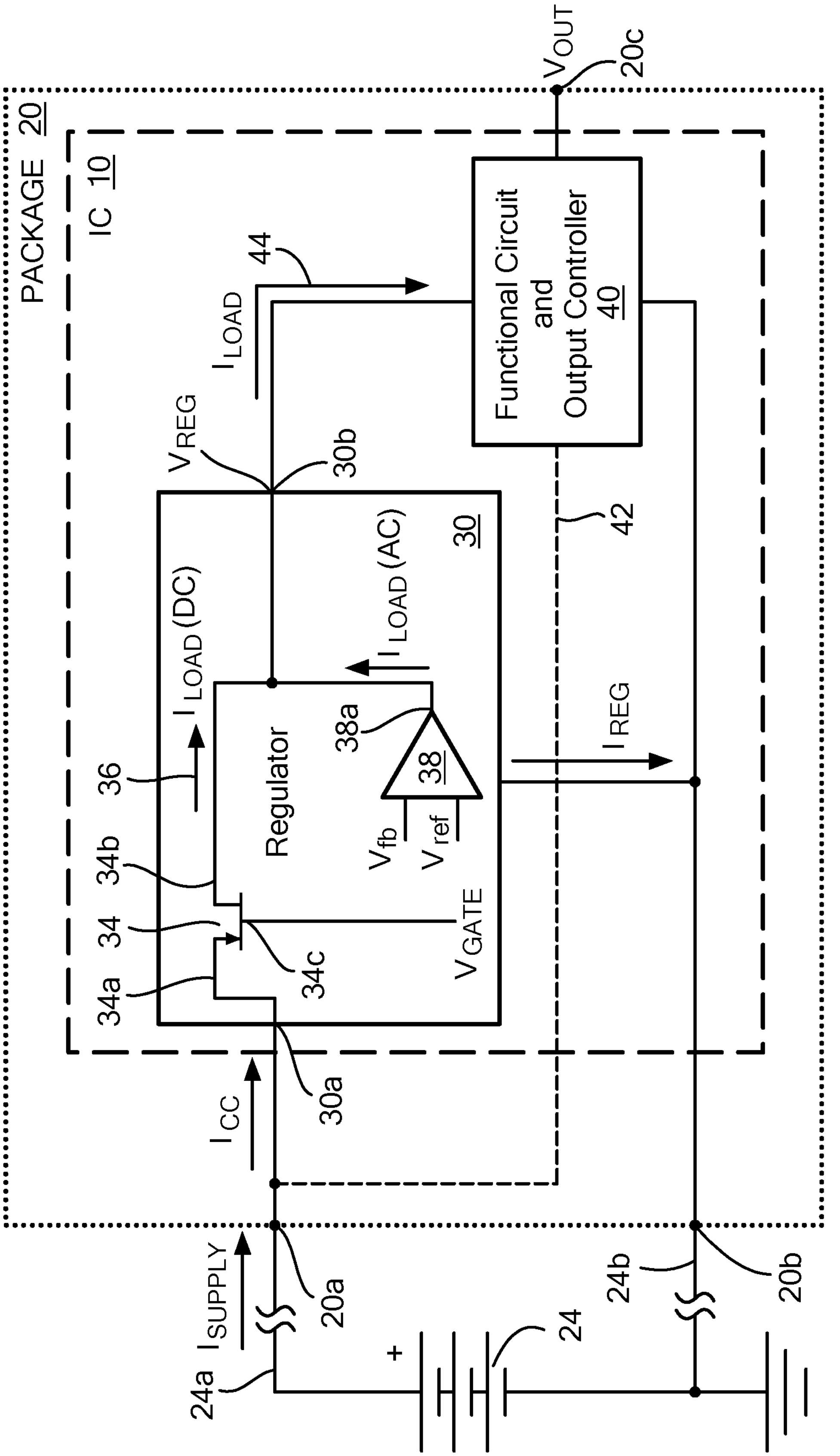
FIG. 1 is a block diagram of an IC having a regulator according to the disclosure.

Referring to FIG. 1, an integrated circuit (IC) 10 includes a regulator 30 and a functional circuit 40 that draws a load current $I_{LOAD}$ 44. The regulator 30 has an input 30*a* coupled to a power source 24 and an output 30*b* at which the load current $I_{LOAD}$ 44 and a regulated voltage $V_{REG}$ are provided.

The power source 24 is connected to the IC 10 by a positive supply connection 24*a* and a negative, ground, or return connection 24*b*, as shown. Power source 24 provides a supply current $I_{SUPPLY}$ to the IC 10, which current can alternatively be referred to as the $I_{CC}$ current.

A package 20 housing the IC 10 can have two or more connections or pins. Supply connections 24*a*, 24*b* are coupled to IC package pins 20*a*, 20*b*, respectively. In some applications in which the IC package 20 is located at a distance from system components with which the IC 10 communicates, the supply connections 24*a*, 24*b* can be long and can pick up noise and can emit noise, sometimes referred to as emissions.

The functional circuit 40 generates an output signal of the IC 10 that is coupled to external circuits and systems (e.g., an automotive computer or engine control unit) that respond to the communicated information according to system design and requirements.

In some embodiments, one or more IC output signals are communicated outside of the IC package 20 by superimposing current levels on the supply connections 24*a*, 24*b* in the case of a so-called two-wire device. In some two-wire embodiments, output signal current levels are implemented by modulating the supply current $I_{CC}$ in which case block 40 can represent both the functional circuit and the output controller. In other two-wire embodiments, a separate block can control the output current levels injected onto the supply connections 24*a*, 24*b* (i.e., as is sometimes referred to as an $I_{CC}$ controller and as represented by optional connection 42). Thus, the output controller aspect of block 40 represents an interface between the output signal of the functional circuit and circuits and systems external to the IC package 20.

In some embodiments, one or more IC output signals can be communicated outside of the IC package 20 through one or more separate, dedicated connections or pins 20*c* in the case of a so-called three-wire device. It will be appreciated that the form of the output interface can vary based on the IC device type and application.

Regulator 30 includes a pass element 34 having an input terminal 34*a* coupled to the regulator input 30*a*, an output terminal 34*b* coupled to the regulator output 30*b*, and a control terminal 34*c*. Pass element 34 can be a Metal Oxide Semiconductor Field Effect Transistor (MOSFET), such as a PMOS FET in the illustrated examples or an NMOS FET as non-limiting examples. In the case of the illustrated PMOS FET 34, the input terminal 34*a* is the source terminal, the output terminal 34*b* is the drain terminal, and the control terminal 34*c* is the gate terminal.

According to the disclosure, a current $I_{LOAD}$(DC) 36 through the pass element 34, between the input terminal 34*a* and the output terminal 34*b*, is constant and thus, is independent of the load current 44 drawn by the functional circuit. In the case of the illustrated PMOS pass element 34, the constant pass element current 36 is achieved by biasing the pass element with a constant gate to source voltage.

Drawing a constant current $I_{LOAD}$(DC) 36 from the supply 24 advantageously reduces emissions otherwise associated with an on-chip regulator.

A buffer 38 has an output 38*a* coupled to the regulator output 30*b* and is configured to shunt any portion of the pass element current 36 that is greater than the load current 44. Buffer 38 has a first input coupled to receive a reference voltage Vref and a second input coupled to receive a feedback voltage Vfb that is based on the regulated voltage $V_{REG}$. Buffer amplifier 38 sets the value of the regulated voltage $V_{REG}$ with low impedance.

Functional circuit 40 can take any form of electronic circuitry that can be provided in the form of an integrated circuit. In some embodiments, functional circuit 40 includes one or more magnetic field sensing elements, as shown in the example speed and direction sensor of FIG. 6. Other magnetic field sensors can include a functional circuit in the form of a current sensor that senses a magnetic field generated by a current carried by a conductor, a magnetic switch (also referred to as a proximity detector) that senses the proximity of a ferromagnetic or magnetic object, a rotation detector that senses passing ferromagnetic articles, for example, gear teeth, or a magnetic field sensor that senses a density of a magnetic field. It will be appreciated by those of ordinary skill in the art however that functional circuit 40 is not limited to any particular circuit type and may or may not include magnetic field sensing.

Figure 2:
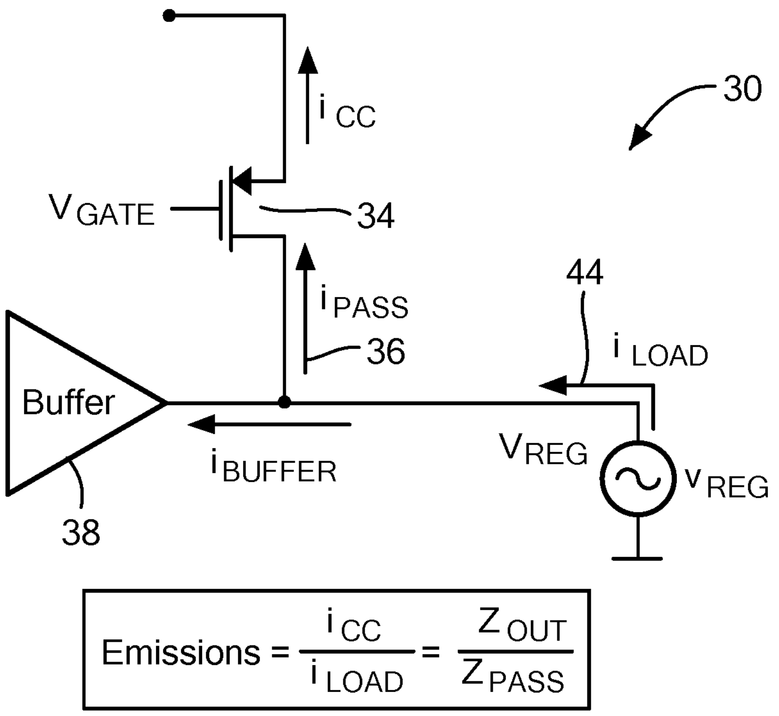
FIG. 2 is a diagram of the regulator of FIG. 1 according to the disclosure.

Referring to FIG. 2, components of the regulator 30 are shown to illustrate the emissions reduction achievable by maintaining a constant pass element current 36. In particular, emissions can be expressed as the ratio of the output impedance $Z_{OUT}$ of the regulator 30 to the transimpedance $Z_{PASS}$ of the pass element 34. The output impedance $Z_{OUT}$ of the regulator 30 is set by buffer 38 and the transimpedance of the pass element 34 is set by the device type and surrounding circuitry. Given the emissions expression, it will be appreciated by those of ordinary skill in the art that an important consideration of the regulator design is that the transimpedance $Z_{PASS}$ of the pass element 34 should not be reduced.

Figure 3:
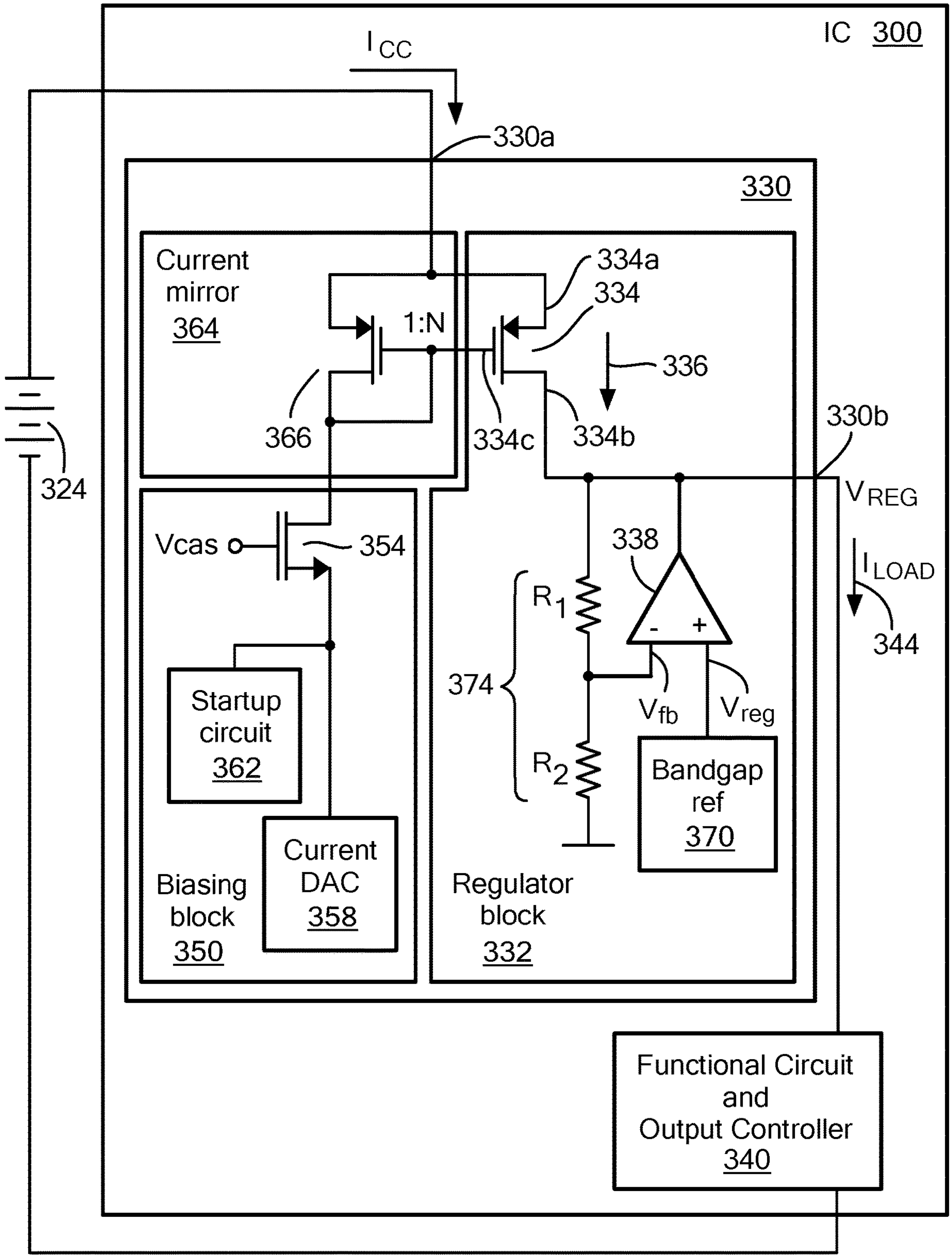
FIG. 3 is a more detailed block diagram of the IC of FIG. 1 according to the disclosure.

Referring to FIG. 3, an IC 300 can represent a more detailed view of the IC 10 of FIG. 1 and thus, includes a regulator 330 and a functional circuit and output controller 340 that draws a load current $I_{LOAD}$ 344. Regulator 330 has an input 330*a* coupled to a power source 324 and an output 330*b* at which the load current $I_{LOAD}$ 344 and a regulated voltage $V_{REG}$ are provided to the functional circuit 340.

Regulator 330 can be arranged in three general sections including a regulator block 332, a current mirror 364, and a biasing block 350. Regulator block 332 can be the same as or similar to regulator 30 of FIG. 1 and thus, can include a pass element 334 having an input terminal 334*a* coupled to the regulator input 330*a*, an output terminal 330*b* coupled to the regulator output 330*b*, and a control terminal 334*c*. Pass element 334 can be a PMOS FET, as shown.

According to the disclosure, a current 336 through the pass element 334, between the input terminal 334*a* and the output terminal 334*b*, is constant and thus, is independent of the load current 344. In the case of the illustrated PMOS pass element 334, the constant pass element current 336 is achieved by biasing the pass element with a constant gate to source voltage. As described above, drawing a constant current $I_{CC}$ from the supply 324 advantageously reduces emissions otherwise associated with an on-chip regulator.

Regulator block 332 further includes a buffer 338 having an output coupled to the regulator output 330*b* and configured to shunt any portion of the pass element current 336 that is greater than the load current 344. Buffer 338 has a first input coupled to receive a reference voltage Vref and a second input coupled to receive a feedback voltage Vfb. The reference voltage Vref can be provided by a bandgap reference 370. The feedback voltage Vfb can be based on the regulated voltage $V_{REG}$. For example, a resistor divider 374 including resistors $R_1$ and $R_2$ can be coupled between the regulated voltage $V_{REG}$ at the regulator output 330*b* and ground to provide the feedback voltage Vfb as a function of the regulated voltage level and the resistors R1, R2. In this way, buffer amplifier 338 sets the value of the regulated voltage $V_{REG}$ with low impedance.

Current mirror 364 can include a mirroring arrangement of transistors including pass element 334 and a transistor 366, here in the form of a PMOS FET. FETs 334, 366 have control or gate terminals that are coupled together and have a size ratio selected so that pass element 334 mirrors a current flow through FET 366 with a ratio "N". In an example embodiment, N can be on the order of twenty-five or fifty.

The current through FET 366 is established by biasing block 350 according to the desired nominal load current 344. Biasing block 350 includes a transistor 354 controlled by a Vcas signal and coupled to a current DAC 358 and a startup circuit 362. Transistor 354 is a cascode to allow high-voltage operation while limiting the current DAC 358 voltage. The Vcas signal can be provided by an auxiliary circuit (not shown) connected to the VCC supply 324.

Current DAC 358 establishes the possible current levels through the current mirror 364. DAC 358 can be configured to set a plurality of $I_{CC}$ current levels desired for communicating IC output signal information. Use of current DAC 358 in this manner advantageously eliminates the need for a separate output control block (sometimes referred to as an $I_{CC}$ controller).

Various schemes are possible for establishing the current DAC current, including user programming. For example, the current DAC 358 can receive a selection code from an on-chip EEPROM memory. There may be a digital controller that, after successful power-on with a default code once the regulated voltage $V_{REG}$ is high enough for proper operation, changes the DAC code to the selected/trimmed value.

Startup circuit 362 forces a current through the current mirror 364 during the power-on sequence in order to ensure that the regulator 330 powers up. If no current were sourced to the functional circuit 340 (i.e., if $I_{LOAD}$ 344 were zero), then the regulated voltage $V_{REG}$ could be stuck at zero.

Figure 4A:
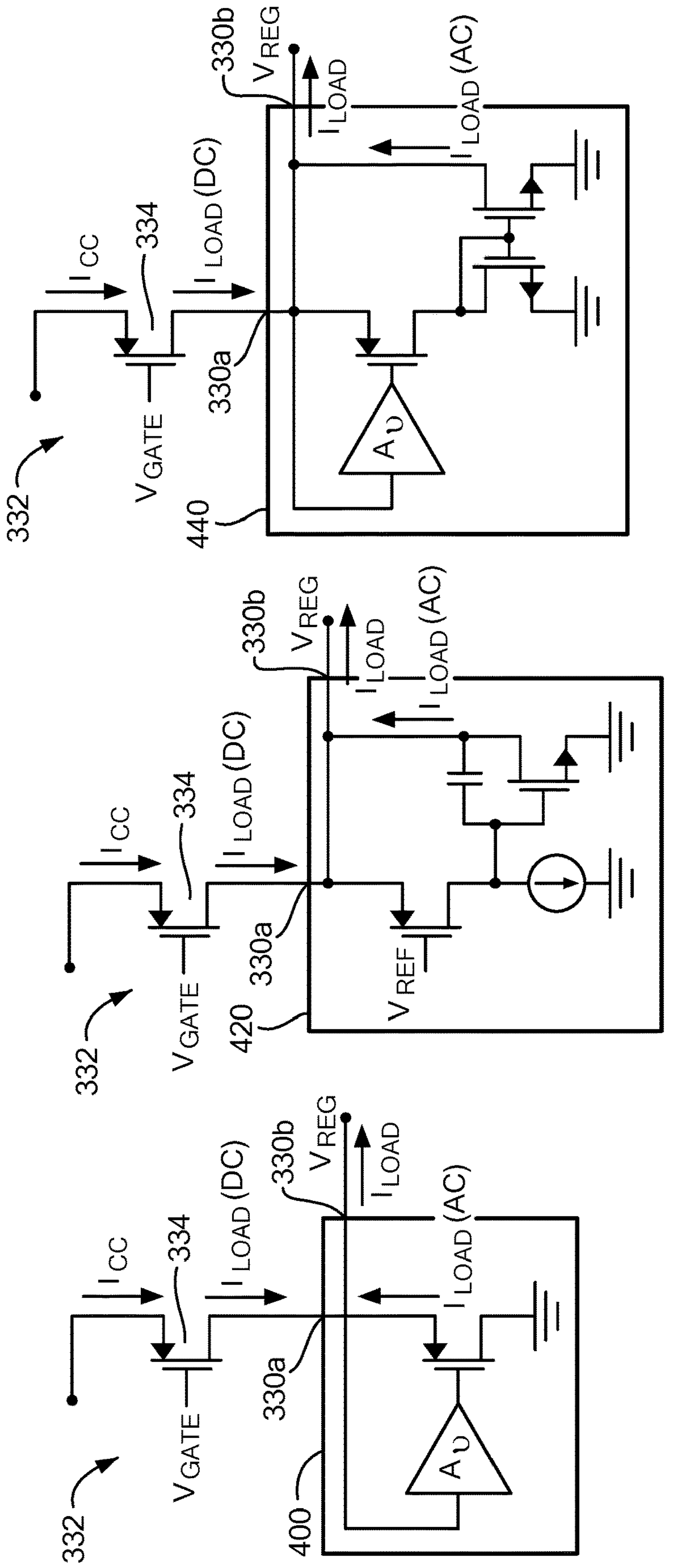
FIGS. 4A and 4B show various buffers suitable for use in the IC of FIGS. 1 and 3.
Figure 4B:
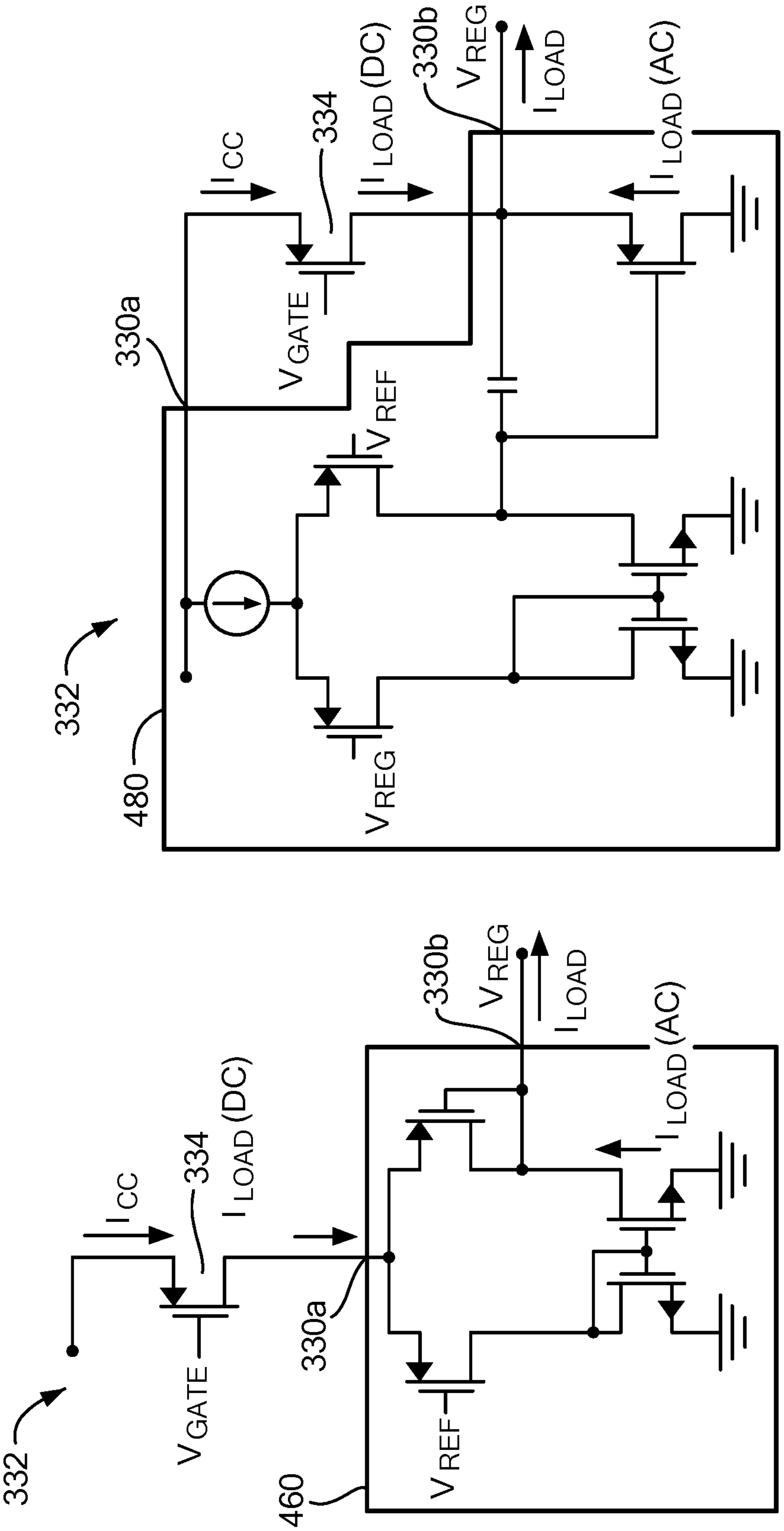

Referring also to FIGS. 4A and 4B, various simplified views of regulator block 332 of FIG. 3 illustrate different suitable buffer amplifier topologies 400, 420, 440, 460, 480 for providing the buffer amplifier 338 of FIG. 3. Each view of the regulator block 332 includes the pass element 334 and regulator input 330*a* and output 330*b* as described above.

In illustrated examples, the following types of buffer amplifiers provide the buffer amplifier 338; namely, a source follower 400, a super-source follower 420, a mirrored source follower 440, a one-stage operational transconductance amplifier (OTA) 460, or a two-stage OTA 480. It will be appreciated by those of ordinary skill in the art that the buffer amplifier 338 is not limited to any particular buffer amplifier topology.

As noted above, a consideration is that any consumption from the external supply (e.g., supply 324 of FIG. 3) be independent of the load consumption $I_{LOAD}$ and output voltage $V_{REG}$, so as to not reduce the effective transimpedance $Z_{PASS}$ of the regulator. In other words, if the transimpedance $Z_{PASS}$ were reduced, then emissions would increase as illustrated by FIG. 2.

Figure 5:
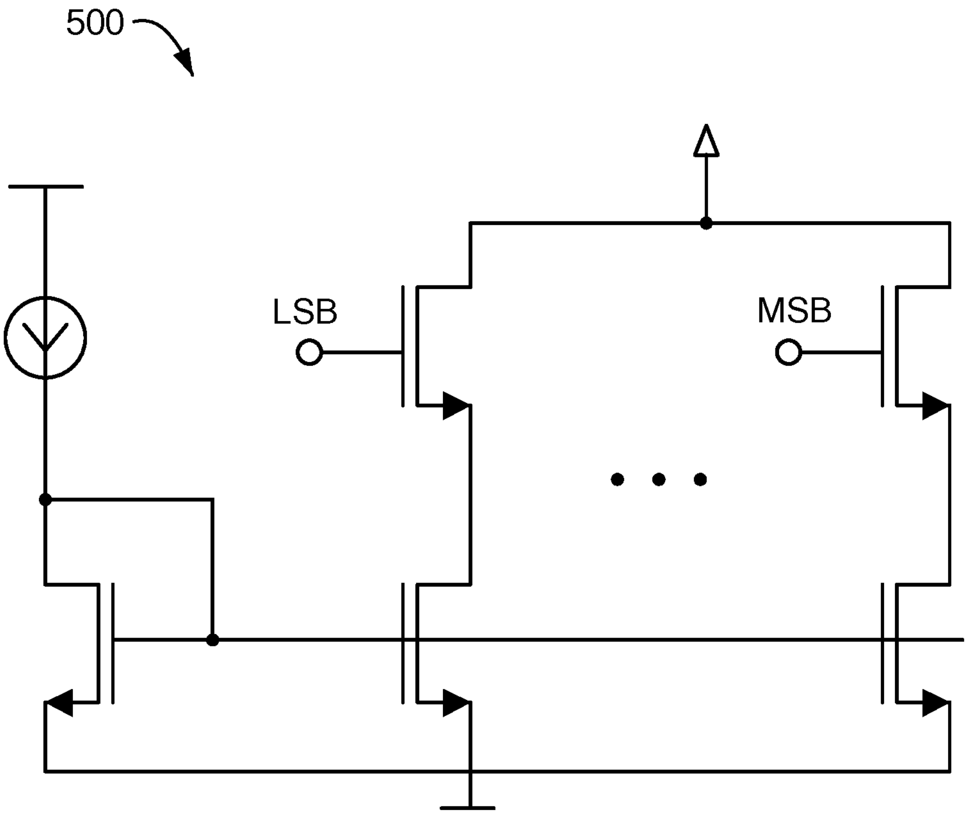
FIG. 5 shows a current DAC suitable for use in the IC of FIGS. 1 and 3.

Referring to FIG. 5, an example current DAC topology 500 of the type that can be used for current DAC 358 of FIG. 3 is shown. Once the startup sequence is completed by the startup circuit 362 and the regulated voltage $V_{REG}$ is high enough for proper operation, internal current references are generated, as may be generated by a Bandgap circuit. This current is fed to the DAC diode to provide biasing. It will be appreciated by those of ordinary skill in the art that the current DAC 358 is not limited to DAC 500 or any particular current DAC topology.

Figure 6:
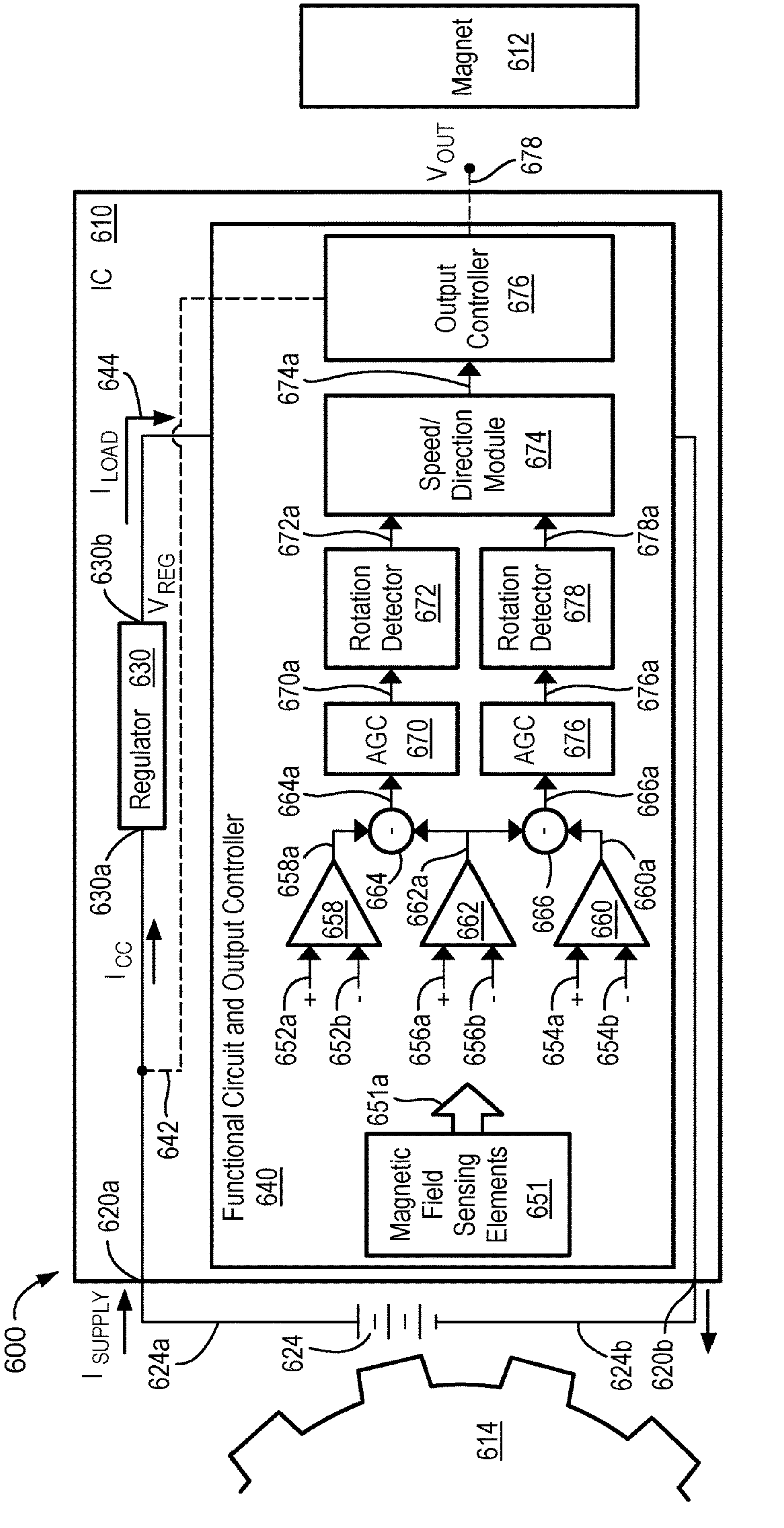
FIG. 6 is a block diagram of a system including a sensor IC according to the disclosure.

Referring to FIG. 6, an example magnetic field sensor system 600 includes a sensor IC 610 generally of the type described above, which sensor IC includes a regulator 630 and a functional circuit and output controller 640 that draws a load current $I_{LOAD}$ 644. The regulator 630 has an input 630*a* coupled to a power source 624 and an output 630*b* at which the load current $I_{LOAD}$ 644 and a regulated voltage $V_{REG}$ are provided to the functional circuit 640.

The power source 624 is connected to the IC 610 by a positive supply connection 624*a* and a negative, ground, or return connection 624*b*, as shown. Power source 624 provides a supply current $I_{SUPPLY}$ to the IC 610, which current can alternatively be referred to as the $I_{CC}$ current.

IC 610 can have two or more connections or pins and can be housed in an IC package (not shown separately in the view of FIG. 6 for simplicity). Supply connections 624*a*, 624*b* are coupled to pins 620*a*, 620*b*, respectively.

The functional circuit 640 generates an output signal of the IC 610 that is coupled to external circuits and systems (e.g., an automotive computer or engine control unit) that respond to the communicated information according to system design and requirements. The IC 610 may be a two-wire device, in which case one or more IC output signals are communicated outside of the IC 610 by superimposing current levels on the supply connections 624*a*, 624*b*. In other embodiments, one or more IC output signals can be communicated outside of the IC 610 through one or more separate, dedicated connections or pins (e.g., pin 620*c*) in the case of a so-called three-wire device or in a device with more than three pins.

As explained above, in some two-wire embodiments, output signal control can be achieved by modulating the supply current $I_{CC}$ and in other two-wire embodiments, a separate block can control the output current levels injected onto the supply connections 624*a*, 624*b* (e.g., as represented by optional connection 642). In example system 600, output signal control is embedded in the regulator 630 and achieved by an output controller 676 that controls output signal communication by modulating the supply current $I_{CC}$.

Regulator 630 can be the same as or similar to regulator 30, 330 (FIGS. 1, 3, respectively) and thus, includes a pass element (not shown) coupled between the regulator input 630*a* and output 630*b* and configured to draw a supply current $I_{SUPPLY}$ from the power source 624 that is constant and thus, that is independent of the load current $I_{LOAD}$ 644. As explained above, achieving a constant supply current $I_{SUPPLY}$ can be accomplished by biasing a PMOS FET pass element of the regulator 630 with a constant gate to source voltage. Regulator 630 also includes a buffer (not shown) that can be the same as or similar to buffer 38, 338 (FIGS. 1, 3, respectively) that sets the regulated voltage $V_{REG}$ with low impedance and shunts any portion of the pass element current that is greater than the load current 644.

Functional circuit 640 implements a magnetic field sensor function. However, it will be appreciated by those of ordinary skill in the art that other types of functional circuits are possible.

Regulator 630 generates a regulated voltage $V_{REG}$ which can provide a power supply voltage to the functional circuit 640. Load current 644 drawn by functional circuit 640 can change with time, temperature, or other factors. However, as described above, the current through the regulator 630 is constant.

Functional circuit 640 can include three magnetic field sensing elements 651 operable to generate three respective magnetic field signals 651*a* in response to movement of a target object, such as gear 614 having gear teeth. System 600 can include a magnet 612 configured to generate a magnetic field to provide a so-called back-biased arrangement, in which case the target object 614 can be a ferromagnetic gear. In other embodiments in which the back bias magnet 612 is omitted, the target object 614 can take the form of a ring magnetic with alternating pole pairs, for example.

The magnetic field sensing elements 651 generate differential signals 652*a*, 652*b*, and 654*a*, 654*b*, and 656*a*, 656*b*, respectively. Functional circuit 640 can include amplifiers 658, 660, 662 coupled to receive differential signals 652*a*, 652*b*, and 654*a*, 654*b*, and 656*a*, 656*b*, respectively, from the three magnetic field sensing elements 651. The amplifiers 658, 660, 662 are configured to generate amplified signals 658*a*, 660*a*, 662*a*, respectively.

The amplified signals 658*a*, 662*a* are received by a first differencing circuit 664, which is configured to generate a first difference signal 664*a*. The amplified signals 660*a*, 662*a* are received by a second differencing circuit 666, which is configured to generate a second difference signal 666*a*.

Functional circuit 640 can include two rotation detector channels. Automatic gain controls (AGCs) 670, 676 can be coupled to receive the difference signals 664*a*, 666*a*, respectively, and can be operable to generate gain-controlled signals 670*a*, 676*a*, respectively.

A rotation detector 672 can be coupled to receive the gain-controlled signal 670*a* and can be operable to generate a rotation detector signal 672*a*. A rotation detector 678 can be coupled to receive the gain-controlled signal 676*a* and can be operable generate a rotation detector signal 678*a*. The rotation detector signals 672*a*, 678*a* can be as described below in conjunction with FIG. 7. Suffice it to say here that the gain-controlled signals 670*a*, 676*a* can be sinusoids having analog values and the rotation detector signals 672*a*, 678*a* can be two-state signals having high and low states representative of features (e.g., gear teeth and valleys) of the target 614 passing by the magnetic field sensing elements 651.

A speed and direction module 674 can be coupled to receive the rotation detector signals 672*a*, 678*a* and can be operable to generate a state signal 674*a*. The state signal 674*a* can be indicative of one or more digital states. In an embodiment described below in conjunction with FIG. 7, state signal 674*a* is indicative of three such digital states, however, other numbers of states are also possible.

It will become apparent from FIG. 7 below that the rotation detector signals 672*a*, 678*a* have relative phases that are in accordance with a direction of rotation of the target 614. It should also be apparent that rates (e.g., rate of state changes) of the rotation detector signals 672*a*, 678*a* are representative of a speed of rotation of the target 614.

The speed and direction module 674 is configured to generate the state signal 674*a* that can be representative of at least one of the speed of rotation or the direction of rotation of gear 614. In some embodiments, the state signal 674*a* is representative of both the speed of rotation and the direction of rotation.

Output controller 676 can be coupled to receive the state signal 674*a* and provide the necessary interface to generate one or more sensor IC output signals as can be indicative of a speed of rotation of the target 614 and, in some embodiments, can also be indicative of a direction of rotation of the target. The sensor output signals can be provided on a dedicated output signal connection 678 in the case of a three-wire sensor or a sensor with more than three pins or in the form of current levels in the case of a two-wire sensor. In other words, magnetic field sensor IC 610 can be configured to generate one or more output signals in a three-wire configuration in which case the output controller 676 provides the sensor output signal as a voltage level on a dedicated output connection 678 or in a two-wire configuration, in which case an output controller 676 of the functional circuit 640 can provide current levels indicative of levels of state signal 674*a* to be communicated over the supply connections 624*a*, 624*b*. Illustrative output signals generated by IC 610 are described below in conjunction with FIG. 7.

Figure 7:
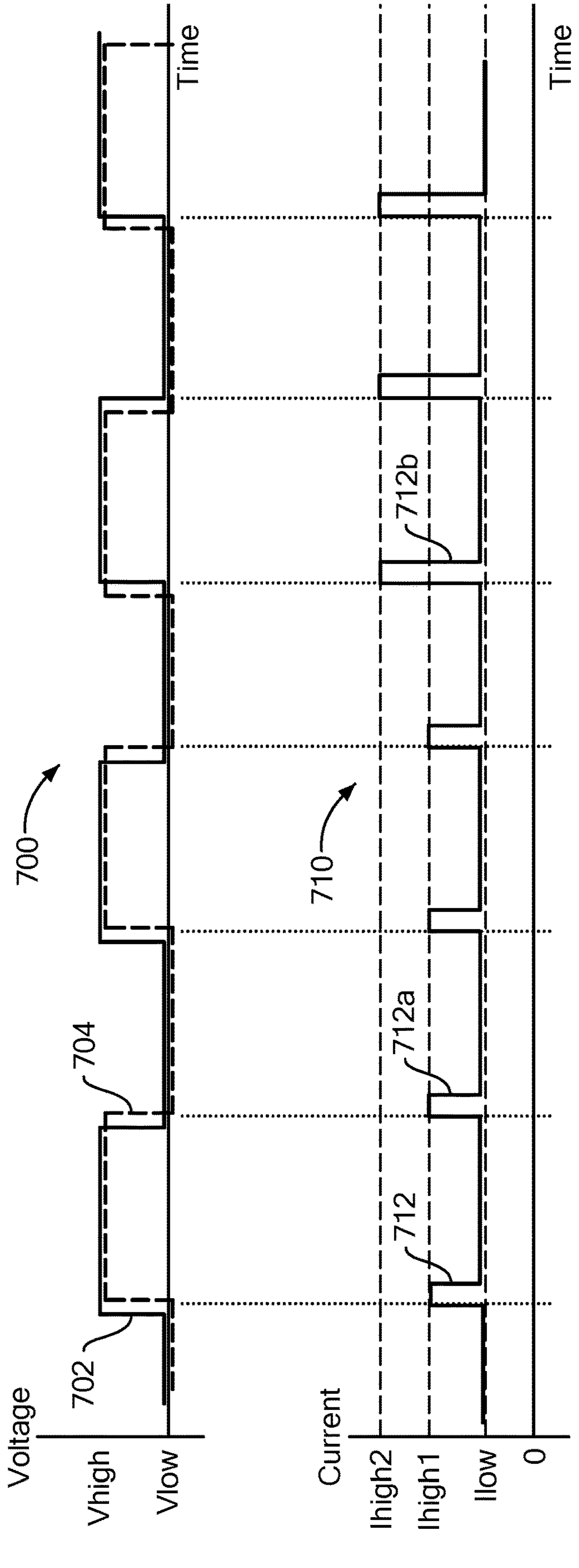
FIG. 7 shows example waveforms associated with the sensor IC of FIG. 6.

Referring now to FIG. 7, a graph 700 has a horizontal axis with a scale in arbitrary units of time and a vertical axis with a scale in arbitrary units of voltage. A first signal 702 can be the same as or similar to the rotation signal 672*a* of FIG. 6 and a second signal 704 can be the same as or similar to the second rotation signal 678*a*.

It should be apparent that the first and second signals 702, 704 can each have a rate of state changes indicative of a speed of rotation of gear 614 (FIG. 6). It should be further apparent that the first and second signals 702, 704 can have relative phases indicative of a direction of rotation of gear 614.

A graph 710 has a horizontal axis with a scale in arbitrary units of time and a vertical axis with a scale in arbitrary units of electrical current. A signal 712 can be the same as or similar to the state signal 674*a* of FIG. 6.

Signal 712 can have a first portion 712*a* with first current states, Ilow, and having second current states, Ihigh1, a state change rate of which is indicative of the speed of rotation of gear 614 when rotating in a first direction. Signal 712 can have a second portion 712*b* with the first current states, Ilow, and having third current states, Ihigh2, a state change rate of which is indicative of the speed of rotation of the gear when rotating in a second direction.

From the signal 712, it should be apparent that the above-described circuits outside of the IC 600 coupled to receive the state signal 674*a* through a two-wire interface as represented by current levels of signal 710 for example, can sense both the speed of rotation of the gear 614 and also the direction of rotation.

A signal comparable to the state signal 274*a* of FIG. 2 is not shown in FIG. 7. However, it should be appreciated that the state signal 274*a* can have one of a variety of signal formats, either serial or parallel.

As used herein, the term "sensor" is used to describe a circuit that uses one or more sensing elements, generally in combination with other circuits. For example, the sensor can be a magnetic field sensor with one or more magnetic field sensing elements. The magnetic field sensor can be, for example, a rotation detector, a movement detector, or a proximity detector. A linear sensor can sense a magnetic field strength. A rotation detector (or movement detector) can senses passing target objects, for example, magnetic domains of a ring magnet or a ferromagnetic target (e.g., gear teeth) where the magnetic field sensor is used in combination with a back-bias or other magnet and can determine target movement speed. Also, linear arrangements of ferromagnetic objects are possible that move linearly.

As used herein, the term "magnetic field sensing element" is used to describe a variety of electronic elements that can sense a magnetic field. The magnetic field sensing element can be, but is not limited to, a Hall effect element, a magnetoresistance element, a magnetotransistor, or an inductive coil. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate or in the plane of the substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of maximum sensitivity perpendicular to a substrate, while metal based or metallic magnetoresistance elements (e.g., GMR, TMR, AMR) and vertical Hall elements tend to have axes of maximum sensitivity parallel to a substrate.

As used herein, the term "magnetic field signal" is used to describe any signal that results from a magnetic field experienced by a magnetic field sensing element.

As used herein, the terms "processor" and "controller" are used to describe elements that perform a function, an operation, or a sequence of operations. The function, operation, or sequence of operations can be hard coded into an electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory, in a discrete electronic circuit which can be analog or digital, and/or in special purpose logic circuitry (e.g., a field programmable gate array (FPGA)). Processing can be implemented in hardware, software, or a combination of the two. Processing can be implemented using computer programs executed on programmable computers/machines that include one or more processors, a storage medium or other article of manufacture that is readable by the processor (including volatile and non-volatile memory and/or storage elements), at least one input device and one or more output devices. Program code can be applied to data entered using an input device to perform processing and to generate output information. A processor or controller can contain internal processors or modules that perform portions of the function, operation, or sequence of operations. Similarly, a module can contain internal processors or internal modules that perform portions of the function, operation, or sequence of operations of the module.

It should be understood that a so-called "comparator" can be comprised of an analog comparator having a two-state output signal indicative of an input signal being above or below a threshold level (or indicative of one input signal being above or below another input signal). However, the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, that includes a list of elements is not necessarily limited to only those elements but can include other elements not expressly listed or inherent to such apparatus, method, composition, mixture, or article.

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

It is noted that various connections and positional relationships (e.g., over, below, adjacent, etc.) may be used to describe elements and components in the description and drawings. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship. As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment. Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

Having described preferred embodiments of the present disclosure, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. An integrated circuit (IC) regulator having an input coupled to a supply voltage and an output at which a load current and a regulated voltage are provided to a functional circuit of the IC, the regulator comprising:

a pass element having an input terminal coupled to the regulator input, an output terminal coupled to the regulator output, and a control terminal, wherein a pass element current between the input terminal and the output terminal is independent of the load current;

a buffer having an output coupled to the regulator output and configured to shunt any portion of the pass element current that is greater than the load current;

a transistor coupled to the pass element in a current mirror configuration; and a biasing circuit coupled to the transistor and configured to establish the pass element current, wherein the biasing circuit comprises a current DAC.

2. The IC regulator of claim 1 wherein the biasing circuit further comprises a startup circuit.

3. An integrated circuit (IC) comprising:

a regulator having an input coupled to a supply voltage and an output at which a load current and a regulated voltage are provided, the regulator comprising:

a pass element having an input terminal coupled to the regulator input, an output terminal coupled to the regulator output, and a control terminal, wherein a pass element current between the input terminal and the output terminal is independent of the load current;

a buffer having an output coupled to the regulator output and configured to shunt any portion of the pass element current that is greater than the load current;

a functional circuit coupled to the output of the regulator and configured to draw the load current;

a transistor coupled to the pass element in a current mirror configuration; and a biasing circuit coupled to the transistor and configured to establish the pass element current, wherein the biasing circuit comprises a current DAC.

4. The IC of claim 3 wherein the biasing circuit further comprises a startup circuit configured to force a current through the current mirror.

5. The IC of claim 3 wherein the pass element is a MOSFET device biased with a constant gate to source voltage.

6. The IC of claim 3 wherein the IC is provided in a two-wire package having a first pin coupled to a positive connection of the supply voltage and a second pin coupled to a negative connection of the supply voltage, and wherein an output signal of the functional circuit is provided on the positive and negative supply voltage connections.

7. The IC of claim 3 wherein the IC is provided in a three-wire package having a first pin coupled to a positive connection of the supply voltage, a second pin coupled to a negative connection of the supply voltage, and a third pin at which an output signal of the functional circuit is provided.

8. The IC of claim 3 wherein the buffer has a first input coupled to receive a reference voltage and a second input coupled to receive a feedback voltage that is based on the regulated voltage.

9. An integrated circuit (IC) regulator having an input coupled to a supply voltage and an output at which a load current and a regulated voltage are provided to a functional circuit of the IC, the regulator comprising:

a pass element having an input terminal coupled to the regulator input, an output terminal coupled to the regulator output, and a control terminal, wherein a pass element current between the input terminal and the output terminal is independent of the load current;

a buffer having an output coupled to the regulator output and configured to shunt any portion of the pass element current that is greater than the load current, wherein the buffer comprises a source follower or an operational transconductance amplifier;

a transistor coupled to the pass element in a current mirror configuration; and a biasing circuit coupled to the transistor and configured to establish the pass element current, wherein the biasing circuit comprises a current DAC.

10. The IC regulator of claim 9 wherein the biasing circuit further comprises a startup circuit.

11. An integrated circuit (IC) regulator having an input coupled to a supply voltage and an output at which a load current and a regulated voltage are provided to a functional circuit of the IC, the regulator comprising:

a pass element having an input terminal coupled to the regulator input, an output terminal coupled to the regulator output, and a control terminal, wherein a pass element current between the input terminal and the output terminal is independent of the load current;

a buffer having an output coupled to the regulator output and configured to shunt any portion of the pass element current that is greater than the load current;

a transistor coupled to the pass element in a current mirror configuration; and a biasing circuit coupled to the transistor and configured to establish the pass element current, wherein the biasing circuit comprises a current DAC, and wherein the pass element is a MOSFET device biased with a constant gate to source voltage.

12. An integrated circuit (IC) regulator having an input coupled to a supply voltage and an output at which a load current and a regulated voltage are provided to a functional circuit of the IC, the regulator comprising:

a pass element having an input terminal coupled to the regulator input, an output terminal coupled to the regulator output, and a control terminal, wherein a pass element current between the input terminal and the output terminal is independent of the load current;

a buffer having an output coupled to the regulator output and configured to shunt any portion of the pass element current that is greater than the load current;

a transistor coupled to the pass element in a current mirror configuration; and a biasing circuit coupled to the transistor and configured to establish the pass element current, wherein the biasing circuit comprises a current DAC, and wherein the buffer has a first input coupled to receive a reference voltage and a second input coupled to receive a feedback voltage that is based on the regulated voltage.

13. An integrated circuit (IC) comprising:

a regulator having an input coupled to a supply voltage and an output at which a load current and a regulated voltage are provided, the regulator comprising:

a pass element having an input terminal coupled to the regulator input, an output terminal coupled to the regulator output, and a control terminal, wherein a pass element current between the input terminal and the output terminal is independent of the load current;

a buffer having an output coupled to the regulator output and configured to shunt any portion of the pass element current that is greater than the load current;

a functional circuit coupled to the output of the regulator and configured to draw the load current, wherein the buffer comprises a source follower or an operational transconductance amplifier;

a transistor coupled to the pass element in a current mirror configuration; and a biasing circuit coupled to the transistor and configured to establish the pass element current, wherein the biasing circuit comprises a current DAC.

14. The IC regulator of claim 13, wherein the biasing circuit further comprises a startup circuit configured to force a current through the current mirror.

* * * * *